United States Patent
Zimmermann et al.

(10) Patent No.: US 8,372,561 B2
(45) Date of Patent: Feb. 12, 2013

(54) COMPOSITE FLUID STORAGE UNIT WITH INTERNAL FLUID DISTRIBUTION FEATURE

(75) Inventors: Joerg Zimmermann, Vancouver (CA); Tristan Sloan, Vancouver (CA); Mikhail Gurin, Burnaby (CA)

(73) Assignee: Societe BIC, Clichy (FR)

( * ) Notice: Subject to any disclaimer, the term of this patent is extended or adjusted under 35 U.S.C. 154(b) by 0 days.

(21) Appl. No.: 12/052,848

(22) Filed: Mar. 21, 2008

(65) Prior Publication Data

US 2008/0233460 A1    Sep. 25, 2008

Related U.S. Application Data

(60) Provisional application No. 60/896,170, filed on Mar. 21, 2007.

(51) Int. Cl.
- *B65D 85/00* (2006.01)
- *B65D 65/40* (2006.01)
- *H01M 8/04* (2006.01)

(52) U.S. Cl. ............ 429/515; 206/7; 220/661; 502/400; 502/409; 502/414; 502/416; 502/401; 502/526

(58) Field of Classification Search .................... 429/34, 429/218.2, 512–516; 206/0.7; 220/661; 95/90–148; 96/108–154, 900–903; 420/900; 423/248, 658.2; 502/400–439, 500, 501, 502/503, 526

See application file for complete search history.

(56) References Cited

U.S. PATENT DOCUMENTS

| | | | |
|---|---|---|---|
| 3,598,275 A | 8/1971 | Francois | |
| 3,703,976 A | 11/1972 | Hughes et al. | |
| 4,110,425 A | 8/1978 | Buhl et al. | |
| 4,134,491 A | 1/1979 | Turillon et al. | |
| 4,249,654 A | 2/1981 | Helversen | |
| 4,360,569 A * | 11/1982 | Steyert et al. | 428/566 |
| 4,583,638 A | 4/1986 | Bernauer et al. | |
| 4,600,525 A | 7/1986 | Baker et al. | |
| 4,607,826 A | 8/1986 | Ron | |
| 4,799,360 A | 1/1989 | Retallick et al. | |
| 5,360,461 A | 11/1994 | Meinzer | |
| 5,476,189 A | 12/1995 | Duvall et al. | |
| 5,512,087 A | 4/1996 | Varner et al. | |
| 5,527,638 A | 6/1996 | Kinoshita et al. | |
| 5,841,043 A * | 11/1998 | Nishimura et al. | 75/231 |
| 6,143,052 A | 11/2000 | Kiyokawa et al. | |
| 6,267,299 B1 | 7/2001 | Meyer | |
| 6,306,339 B1 | 10/2001 | Kiyokawa et al. | |

(Continued)

FOREIGN PATENT DOCUMENTS

| | | |
|---|---|---|
| GB | 2159133 A | 11/1985 |
| IN | 251898 | 4/2012 |

(Continued)

OTHER PUBLICATIONS

"U.S. Appl. No. 11/379,970, Non-Final Office Action mailed Jan. 29, 2009", 16. pgs.

(Continued)

*Primary Examiner* — Roy King
*Assistant Examiner* — Jared Wood
(74) *Attorney, Agent, or Firm* — Schwegman Lundberg & Woessner, P.A.

(57) ABSTRACT

Embodiments of the invention relate to a fluid storage unit comprising a composite fluid storage material and one or more internal fluid distribution features. The one or more internal fluid distribution features increase the homogeneity of fluid interaction within the composite fluid storage material, benefiting a number of properties and functions.

32 Claims, 5 Drawing Sheets

U.S. PATENT DOCUMENTS

| | | | |
|---|---|---|---|
| 6,444,016 | B2 | 9/2002 | Oshima et al. |
| 6,520,219 | B2 | 2/2003 | Sapovalov et al. |
| 6,547,092 | B1 | 4/2003 | Chervatsky |
| 6,596,055 | B2 | 7/2003 | Cooper et al. |
| 6,620,225 | B2 | 9/2003 | Wang et al. |
| 6,638,348 | B2 | 10/2003 | Kuriiwa et al. |
| 7,323,043 | B2 | 1/2008 | Finamore |
| 7,404,842 | B1 | 7/2008 | Wainright et al. |
| 7,563,305 | B2 | 7/2009 | Zimmermann |
| 7,681,753 | B2 | 3/2010 | Yokota et al. |
| 7,708,815 | B2 | 5/2010 | Zimmermann |
| 7,926,650 | B2 | 4/2011 | Zimmermann et al. |
| 8,132,667 | B2 | 3/2012 | Zimmermann |
| 2002/0009641 | A1 | 1/2002 | Tanaka et al. |
| 2002/0182459 | A1 | 12/2002 | Hockaday et al. |
| 2003/0126991 | A1 | 7/2003 | Wang et al. |
| 2003/0209147 | A1 | 11/2003 | Myasnikov et al. |
| 2004/0065171 | A1 | 4/2004 | Hearley et al. |
| 2004/0089151 | A1 | 5/2004 | Wang et al. |
| 2004/0178083 | A1 | 9/2004 | Yang et al. |
| 2004/0231823 | A1 | 11/2004 | Tsuji |
| 2004/0265670 | A1 | 12/2004 | Muller et al. |
| 2005/0022883 | A1 | 2/2005 | Adams et al. |
| 2005/0025921 | A1 | 2/2005 | Finamore |
| 2005/0036941 | A1* | 2/2005 | Bae et al. ............ 423/658.2 |
| 2005/0241479 | A1 | 11/2005 | Lebowitz et al. |
| 2006/0021882 | A1 | 2/2006 | Kaye et al. |
| 2006/0086125 | A1 | 4/2006 | Sueoka et al. |
| 2006/0169144 | A1 | 8/2006 | Forslund |
| 2006/0188717 | A1 | 8/2006 | Kambara et al. |
| 2006/0237688 | A1* | 10/2006 | Zimmermann ............ 252/184 |
| 2006/0248921 | A1 | 11/2006 | Hosford et al. |
| 2007/0166586 | A1* | 7/2007 | Marchand et al. ............ 429/25 |
| 2007/0295617 | A1 | 12/2007 | Zimmermann |
| 2009/0255831 | A1 | 10/2009 | Zimmermann |
| 2010/0187468 | A1 | 7/2010 | Zimmermann |
| 2012/0141369 | A1 | 6/2012 | Zimmermann |

FOREIGN PATENT DOCUMENTS

| | | |
|---|---|---|
| JP | 59-147032 A | 8/1984 |
| JP | 59219429 A | 12/1984 |
| JP | 63-147801 A | 6/1988 |
| JP | 01-246101 A | 10/1989 |
| JP | 01-264901 A | 10/1989 |
| JP | 05-159798 A | 6/1993 |
| JP | 05-235575 | 9/1993 |
| JP | 11-050169 A | 2/1999 |
| KR | 101160552 B1 | 6/2012 |
| SG | 148757 | 7/2011 |
| SG | 137026 A1 | 9/2011 |
| WO | WO-2006/111005 A1 | 10/2006 |
| WO | WO-2007/147260 A1 | 12/2007 |

OTHER PUBLICATIONS

"U.S. Appl. No. 11/379,970, Preliminary Amendment mailed Dec. 20, 2007", 15 pgs.

"U.S. Appl. No. 11/473,591, Response filed Jan. 9, 2009 to Non Final Office Action mailed Oct. 9, 2008", 16 pgs.

"U.S. Appl. No. 11/473,591, Non-Final Office Action mailed Oct. 9, 2008", 8 pgs.

"U.S. Appl. No. 11/473,591, Notice of Allowance mailed Mar. 16, 2009", 9 pgs.

"International Application Serial No. PCT/CA2007/001129, International Search Report mailed Oct. 19, 2007", 3 pgs.

"International Application Serial No. PCT/CA2007/001129, Written Opinion mailed Oct. 19, 2007", 5 pgs.

International Application No. PCT/CA2006/000588, International Search Report mailed Sep. 5, 2006, 3 pgs.

International Application No. PCT/CA2006/000588, Written Opinion mailed Sep. 5, 2006, 6 pgs.

Schmidt, W.R., et al., "Hydrogen Storage in Polymer-dispersed Metal Hydrides (PDMH)", *Proceedings of the 2001 DOE Hydrogen Program Review*, NREL/CP-470-30535,(2001), 14 pgs.

Shih, R. J., et al., "Self-Supported Electrodes Made of $LaNi_{4.25}Al_{0.15}Co_{0.5}V_{0.1}$ and Ag or Ni Hydrogenation", *International Journal of Hydrogen Energy*, vol. 31, (2006), 1716-1720.

Züttel, A., "Materials for Hydrogen Storage", *Materialstoday*, (2003), 24-33.

"U.S. Appl. No. 11/379,970, Final Office Action mailed Jun. 23, 2009", 16 pgs.

"U.S. Appl. No. 11/379,970, Response filed Apr. 29, 2009 to Non Final Office Action mailed Jan. 29, 2009", 14 pgs.

"U.S. Appl. No. 11/379,970, Response filed Oct. 23, 2009 to Final Office Action mailed Jun. 23, 2009", 18 pgs.

"Canadian Application Serial No. 2,605,695, Office Action mailed Jun. 22, 2009", 3 pgs.

"Canadian Application Serial No. 2,605,695, Amendment filed Jan. 6, 2011 to Office Action mailed Jul. 6, 2010", 12 pgs.

"Canadian Application Serial No. 2,605,695, Office Action mailed Jul. 6, 2010", 3 pgs.

"Canadian Application Serial No. 2,605,695, Response and Amendment filed Dec. 22, 2009 to Office Action mailed Jun. 22, 2009", 21 pgs.

"Chinese Application Serial No. 200680021474.8, Office Action mailed Apr. 22, 2010", (w/ English Translation), 16 pgs.

"Chinese Application Serial No. 200680021474.8, Response filed Sep. 6, 2010 to Office Action mailed Apr. 22, 2010", (w/ English Translation of Claims), 12 pgs., English Claims Only.

"Chinese Application Serial No. 200780030747.X, Office Action mailed Nov. 16, 2010", (w/ English Translation), 22 pgs.

"European Application Serial No. EP07720043.4, Extended European Search Report mailed Dec. 7, 2010", 10 pgs.

"European Application Serial No. EP07720043.4, Response filed Mar. 6, 2009", 14 pgs.

"Indian Application Serial No. 10723/DELNP/2008, Voluntary Amendment filed Jul. 5, 2010", 9 pgs.

"Japanese Application Serial No. 2008-506893, Office Action mailed Jan. 18, 2011", (w/ English Translation), 6 pgs.

"Korean Application Serial No. 10-2007-7027181, Amendment filed Feb. 24, 2010", (w/ English Translation of Amended Claims), 23 pgs, English Claims Only.

"Korean Application Serial No. 10-2007-7027181, Amendment filed Jun. 29, 2009 to Office Action mailed Apr. 28, 2009", (w/ English Translation of Claims), 38 pgs, English Claims Only.

"Korean Application Serial No. 10-2007-7027181, Final Office Action dated Oct. 26, 2009", (English Summary), 1 pg.

"Korean Application Serial No. 10-2007-7027181, Office Action mailed Aor. 28, 2009", (w/ English Summary), 6 pgs, English Portions Only.

"Singapore Application Serial No. 200717077-2, Invitation to Response to Written Opinion mailed Mar. 25, 2010", 5 pgs.

"Singapore Application Serial No. 200717077-2, Response filed Aug. 25, 2010 to Office Action and Written Opinion mailed Mar. 25, 2010", 11 pgs.

"Singapore Application Serial No. 200809490, Response filed May 14, 2010 to Written Opinion mailed Nov. 25, 2009", 12 pgs.

"Singapore Application Serial No. 200809490, Written Opinion mailed Nov. 25, 2009", 6 pgs.

"U.S. Appl. No. 12/489,136, Response filed Oct. 27, 2011 to Final Office Action mailed Oct. 14, 2011", 6 pgs.

"U.S. Appl. No. 12/489,136, Final Office Action mailed Oct. 14, 2011", 8 pgs.

"U.S. Appl. No. 12/489,136, Notice of Allowance mailed Nov. 7, 2011", 7 pgs.

"U.S. Appl. No. 12/489,136, Response filed Aug. 12, 2011 to Non Final Office Action mailed May 13, 2011", 11 pgs.

"Canadian Application Serial No. 2,605,695, Office Action mailed Jul. 20, 2011", 2 pgs.

"European Application Serial No. EP07720043.4, Response filed Jun. 30, 2011 to Extended European Search Report mailed Dec. 7, 2010", 14 pgs.

"Singapore Application Serial No. 200717077-2, Examination Report mailed May 27, 2011", 5 pgs.

"European Application Serial No. 06721830.5, Extended Search Report mailed Oct. 18, 2011", 7 pgs.

"Korean Application Serial No. 10-2010-7004120, Office Action mailed Jun. 13, 2011", (w/ English Summary, 7 pgs, English Language Summary Only.

"Korean Application Serial No. 10-2010-7004120, Response filed Nov. 14, 2011 to Office Action mailed Jun. 13, 2011", (w/ English Translation of Amended Claims), 28 pgs, English Language Claims Only.

"U.S. Appl. No. 12/489,136, Non Final Office Action mailed May 13, 2011", 8 pgs.

"Chinese Application Serial No. 200780030747.X, Response filed Apr. 1, 2011 to Office Action mailed Nov. 16, 2010", (w/ English Translation of the Claims), 12 pgs, English Language Claims Only.

"Indian Application Serial No. 8079/DELNP/2007, First Examiner Report mailed Apr. 18, 2011", 3 pgs.

"Japanese Application Serial No. 2008-506893, Response filed Apr. 15, 2011 to Office Action mailed Jan. 18, 2011", (w/ English Translation of Amendments), 12 pgs, English Language Claims Only.

"Canadian Application Serial No. 2605695, Amendment filed Jan. 20, 2012 in response to Office Action mailed Jul. 20, 2011", 11 pgs.

"Chinese Application Serial No. 200780030747.X, Office Action mailed Nov. 8, 2011", 14 pgs.

"Chinese Application Serial No. 200780030747.X, Response filed Jan. 11, 2012 to Office Action mailed Nov. 8, 2011", 12 pgs, English Claims Only.

"European Application Serial No. 06721830.5, Response filed May 3, 2012 to Extended Search Report mailed Oct. 18, 2011", 6 pgs.

"India Application Serial No. 8079/DELNP/2007, Response filed Dec. 16, 2011 to Office Action mailed Apr. 18, 2011", 4 pgs.

"Japanese Application Serial No. 2008-506893, Office Action mailed Feb. 7, 2012", 9 pgs.

"Korean Application Serial No. 10-2007-7027181, Trial Decision mailed Feb. 17, 2012", EN Translation Only, 4 pgs.

"U.S. Appl. No. 12/727,729 Response filed Jun. 21, 2012 to Restriction Requirement mailed May 31, 2012", 6 pgs.

"U.S. Appl. No. 12/727,729, Non Final Office Action mailed Jul. 5, 2012", 8 pgs.

"U.S. Appl. No. 12/727,729, Restriction Requirement mailed May 31, 2012", 7 pgs.

"Canadian Application Serial No. 2605695, Office Action mailed May 1, 2012", 3 pgs.

"Chinese Application Serial No. 200780030747.X, Office Action mailed May 24, 2012", 15 pgs.

"Chinese Application Serial No. 200780030747.X, Response filed Aug. 6, 2012 to Office Action mailed May 24, 2012", 12 pgs, English language claims only.

"U.S. Appl. No. 11/379,970, Notice of Allowance mailed Dec. 22, 2009", 7 Pgs.

"U.S. Appl. No. 12/052,848, Notice of Non-compliant Amendment mailed Jun. 12, 2009", 2 pgs.

* cited by examiner

COMPOSITE FLUID STORAGE UNIT WITH INTERNAL FLUID DISTRIBUTION FEATURE

PRIORITY OF INVENTION

This application claims the benefit of priority under 35 U.S.C. §119(e) to U.S. patent application Ser. No. 60/896,170, filed Mar. 21, 2007 which is herein incorporated by reference in its entirety.

BACKGROUND

Composite fluid storage materials may be combined with enclosures, such as conformable enclosures, to provide a composite fluid storage unit that is lightweight and composed primarily of active fluid storage material. Composite hydrogen storage materials are examples. The mass and volume of non-storage materials is very low, resulting in fluid storage densities approaching the limit of the bulk storage material itself. The composite fluid storage material may be a porous, elastic solid. Any fluid entering or leaving the storage unit must be transported through the solid. Therefore, as the density of the solid increases to pack more active material into the enclosure, the ability to transport fluid is decreased of composite fluid storage materials.

The composite fluid storage unit may be utilized with a fuel cell, for example. The fuel cell may demand a flowrate of fluid at a high enough level to generate the consistent power required for its intended purpose. This flowrate can often be quite high, depending on the application. Similarly, when attempting to achieve a fast refueling of the storage unit, the flowrate of fluid into the unit must also be high. The flowrate, heat transfer and homogeneity of the fluid into or out of the composite fluid storage material are severely limited by the low porosity of the material.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
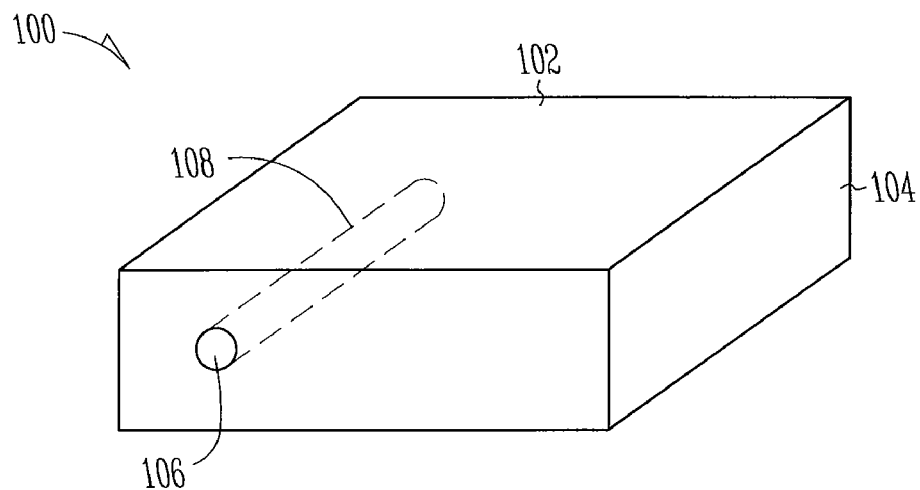
FIG. 1 illustrates a perspective view of a composite fluid storage unit including an internal fluid distribution feature, according to some embodiments.

Embodiments of the invention relate to a fluid storage unit comprising a composite fluid storage material and one or more internal fluid distribution features. The storage unit may also comprise an enclosure, at least partially surrounding the composite fluid storage material. Embodiments also relate to a fuel cell system. The system relates to a fluid enclosure including a composite fluid storage material, one or more internal fluid distribution features and one or more fuel cell layers in fluidic communication with the fluid enclosure.

Embodiments also relate to a method of making a fluid storage unit, the method comprising forming a composite fluid storage material and forming one or more internal fluid distribution features. Other methods include methods of operating a fluid enclosure and methods of delivering a fluid.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a composite fluid storage unit that includes a composite fluid storage material and one or more internal fluid distribution features. The features may provide an increased homogeneity in the composite fluid storage material or an increased uniformity in reaction sites or contacting sites for a fluid. The unit has an increased maximum flowrate for fluid into or out of the unit as compared to the maximum flow rate of the bulk composite fluid storage material alone when sized similarly to the composite fluid storage unit. The one or more internal fluid distribution features facilitate or enhance the transfer of fluid into or out of the unit, which may be in contact with a device that utilizes fluid as a power source, such as a fuel cell. The increased flowrate allows for the storage unit to refuel faster and also to keep up with the power demands of many types of external devices. The features also allow for more efficient and rapid heat transfer, thus allowing for quicker reaction rates of fluid storage and delivery.

Definitions

As used herein, "electrochemical layer" refers to a sheet including one or more active functional members of an electrochemical cell. For example, an electrochemical layer may include a fuel cell layer. As used herein, "active functional members" refers to components of an electrochemical cell that function to convert chemical energy to electrical energy or convert electrical energy to chemical energy. Active functional members exhibit ion-conductivity, electrical conductivity, or both.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. Further examples of fuel cells include proton exchange membrane fuel cells, direct methanol fuel cells, alkaline fuel cells, phosphoric acid fuel cells, molten carbonate fuel cells or solid oxide fuel cells.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, trisilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, and formic acid.

As used herein, "fluid enclosure" may refer to a device for storing a fluid. The fluid enclosure may store a fluid physically or chemically. For example, the fluid enclosure may chemically store a fluid in active material particles. A fluid enclosure may also refer to a fluid enclosure including active material particles and an outer enclosure wall, conformably coupled to the fluid storage component and may also include structural fillers. Examples of such a fluid enclosure are found in commonly-owned U.S. patent application Ser. No. 11/473,591, which was filed Jun. 23, 2006, and published on Dec. 27, 2007 as U.S. Patent App. Pub. 2007/0295617 and whose disclosure is incorporated by reference herein in its entirety.

As used herein, "composite fluid storage material" refers to active material particles mixed with a binder, wherein the binder immobilizes the active material particles sufficient to maintain relative spatial relationships between the active material particles. Examples of composite fluid storage materials are found in commonly-owned U.S. patent application Ser. No. 11/379,970, which was filed Apr. 24, 2006, and published on Dec. 27, 2007 as U.S. Patent App. Pub. 2007/0295617 and whose disclosure is incorporated by reference herein in its entirety. An example of a composite fluid storage material is a composite hydrogen storage material.

The composite fluid storage materials can have sufficient structural strength with a proper binder to withstand the strain induced by charging and discharging the active material particles without causing the composite to fracture. Structural strength of the composite fluid storage material allows it to be used as a load bearing member that can resist the force exerted by the hydrogen absorbing into the metal hydride particles. Due to this ability to resist the force produced by particle strain, the composite hydrogen storage material is able to retain its structural integrity and remain as a solid during multiple occlusion and desorption cycles. The composite hydrogen storage material may be shaped as pellets, discs, spheres, wafers, rectangular wafers or any porous or geometric shape.

As used herein, "relative spatial relationships" refers to three-dimensional relationships between particles. Such three-dimensional relationships between particles in the context of the present invention will remain substantially unchanged. For example, the distance between particles may change during the hydriding/ldehydriding cycle, but the particles return to substantially the same position relative to the other particles over the course of one complete cycle. The particle structure may have, e.g., an elastic property, in that the particles may move, but maintain substantially the same three-dimensional positioning substantially relative to other particles as they move. An exemplary indicator of whether a material meets the above characteristics is a qualitative measurement based upon, e.g., the volume, packing density or porosity or a dimension (e.g. length) of the composite material over repeated cycles. As such, when length of the formed composite is used as the indicator, the length of the formed composite will be at least about 80% and not more than about 120% of the parent length measured.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof.

The active material particles are mixed with a binder, such as a thermoplastic binder. Examples of suitable binders include polypropylene, polyethylene, polyvinylidene fluoride (PVDF), hexaflouropropylene vinylidene fluoride copolymer, cross-linked copolymers, polytetrafluoroethylene (PTFE), perfluoro alkoxy (PFA), thermoplastic polyesters (for example, Nylon.™). If a thermoplastic binder is used, the binder may be readily melt-processable and may have an elongation to break of at least about 20%, for example. The amount of binder may be about 50% by weight or less of the mixture. The binder may be flexible enough to withstand the strain produced during a charging and discharging the composite fluid storage material (e.g., hydriding/dehydriding cycles), while not melting or softening during the elevated temperatures of the charging phase.

As used herein, "metal hydrides" may include a metal, metal alloy or metal compound capable of forming a metal hydride when in contact with hydrogen. Metal hydride compounds can be generally represented as follows: $AB$, $AB_2$, $A_2B$, $AB_5$ and BCC, respectively. When bound with hydrogen, these compounds form metal hydride complexes. As used herein, "composite hydrogen storage material" refers to active material particles mixed with a binder, wherein the binder immobilizes the active material particles sufficient to maintain relative spatial relationships between the active material particles.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen or other fluid may be bound physically or chemically, for example.

As used herein, "contacting" refers to physically, chemically, electrically touching or within sufficiently close proximity. A fluid may contact an enclosure, in which the fluid is physically forced inside the enclosure, for example.

Figure 2:
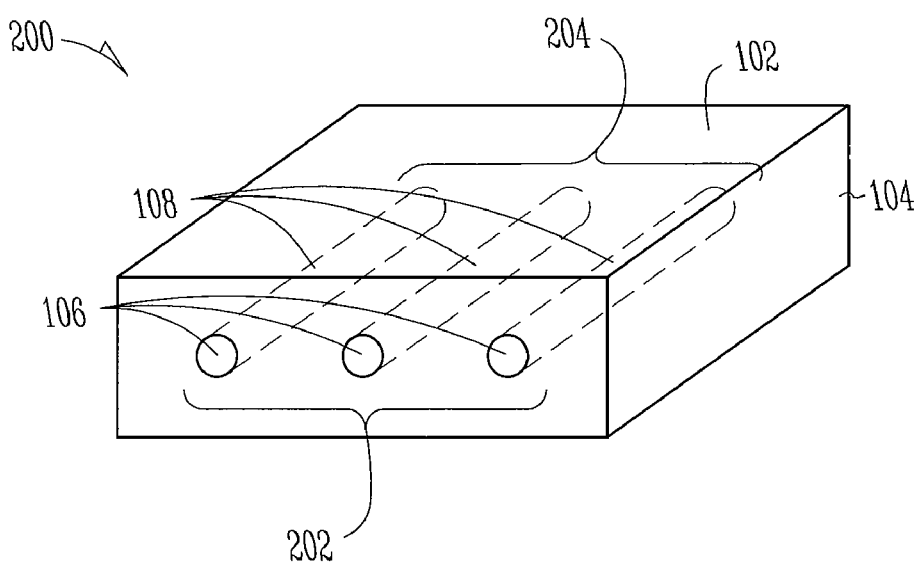
FIG. 2 illustrates a perspective view of a composite fluid storage unit including multiple features, according to some embodiments.

Referring to FIG. 1, a perspective view 100 of a composite fluid storage unit 100 including an internal fluid distribution feature is shown, according to some embodiments. The composite fluid storage unit 100 may include composite fluid storage material 102 surrounded by an enclosure 104. The enclosure 104 may partially or completely enclose the composite fluid storage material 102. An internal fluid distribution feature 108 may be formed in the unit 100 and include an aperture 106. Multiple internal fluid distribution features 204 may be formed in a unit 200 and include multiple apertures 202 (see FIG. 2). The fluid flows into or out of the unit 100 through the one or more apertures 106, 202.

A composite fluid storage material 102 refers to active material particles mixed with a binder, wherein the binder immobilizes the active material particles sufficient to maintain relative spatial relationships between the active material particles. A composite fluid storage material 102 may include composite hydrogen storage materials, for example. Active material particles are material particles capable of storing fluid or material particles that may occlude and desorb a fluid, such as metal hydrides, for example. The active material may be a metal, metal alloy or metal compound capable of forming a metal hydride when in contact with hydrogen.

The internal fluid distribution feature 108 may be of many shapes or sizes. The feature 108 may be a borehole, for example. The internal fluid distribution feature 108 may be drilled after forming of the unit 100. The feature 108 may be formed directly in the composite fluid storage material 102 or formed after the storage material 102 has been surrounded by an enclosure 104. The diameter, depth and shape of the internal fluid distribution feature 108 may be determined to increase the surface area of the composite fluid storage material 102 exposed to the open space within the internal fluid distribution feature 108. By increasing this surface area, while maintaining structural stability, the flowrate of fluid into or out of the unit 100 may be increased. The features 108 may also increase the transfer of heat into or out of the fluid storage unit or enclosure 104, within the composite fluid storage material 102 or both. By increasing the homogeneity of composite fluid storage material 102, the features may also facilitate the occluding/desorbing of fluid storage or delivery. The features 108 may also increase the uniformity in occluding a fluid, uniformity in desorbing a fluid or both.

The one or more internal fluid distribution features 108 may be arranged so as to maintain structural integrity of the unit or enclosure. The one or more internal fluid distribution features 202 may also be connected via an external manifold system, for example. The diameter, depth and shape of the one or more features 108, 202 may be determined experimentally or computationally, once the transport characteristics of the bulk material have been identified.

The internal fluid distribution feature 108 or one or more internal fluid distribution features 202 may include apertures 106, 202. The apertures 106, 202 may independently or in combination with other internal fluid distribution features 108, 202 increase the maximum flowrate of the composite fluid storage unit 100, 200, assist in heat transfer or otherwise increase the effective transfer of a fluid into or out of the storage material 102. The apertures 106, 202 may include multiple surface apertures and high aspect ratio surface apertures, for example. An aperture can be an internal fluid distribution feature, so long as it contributes to an increase in unit effectiveness. One or more ports may also be part of, integrated into or in contact with the unit or enclosure. The one or more ports may be configured to transfer fluid to the unit, transfer fluid from the unit or both. The port may be an aperture or vice versa, for example The flowrate may refer to the movement of mass per time. Volumetric flowrate may also be measured, but may not be as practical. The maximum flowrate of fluid may be measured by mass flow meters. The maximum flowrate that can be obtained from composite fluid storage material is at least partially governed by the internal massflow limitations of the porous material and the exposed surface area which serves as the interface between transport through porous media and transport through open space. The increase in massflow is therefore proportional to the increase in the exposed area. The embodiments of the present invention may increase the maximum flowrate of the composite fluid storage unit by a factor of about 5, about 10, or about 10 or more, for example.

The enclosure 104 may be a fluid enclosure formed by conformably coupling an outer wall to the composite fluid storage material 102, for example. Conformably coupled refers to forming a bond that is substantially uniform between two components and are attached in such as way as to chemically or physically bind in a corresponding shape or form. A structural filler or composite fluid storage material may be conformably coupled to an outer enclosure wall, for example, in which the outer enclosure wall chemically or physically binds to the structural filler or composite fluid storage material and takes its shape. As the force due to internal pressure within the fluid enclosure increases, the load may be transferred directly into a tensile load on the structural filler or composite fluid storage material, rather than internal pressure being amplified into tensile load on the outer enclosure wall. The internal pressure of the fluid enclosure may be affected by the amount of fluid stored. In addition, the amount of stress applied to the fluid enclosure may be affected by the mechanical stress associated with contacting/releasing a fluid from a storage material, such as hydrogen occluding/desorbing from a metal hydride, for example. The outer enclosure wall is the outermost layer within a fluid enclosure that serves to at least partially slow the diffusion of a fluid from the enclosure. The outer enclosure wall may include multiple layers of the same or differing materials. The outer enclosure wall may include a polymer or a metal, for example. The fluid may be hydrogen, for example. Examples of such enclosures may be found in commonly owned U.S. patent application Ser. No. 11/473,591, which was filed Jun. 23, 2006, and published on Dec. 27, 2007 as U.S. Patent App. Pub. 2007/0295617.

The fluid enclosure 104 may be protected with one or more pressure relief components of the self-destructive type, such as fusible triggers, rupture disks and diaphragms, or of the re-sealable type, such as a spring-loaded pressure-relief valve. A pressure relief component may be "pressure-activated", set to activate at a certain pressure. Alternately, a pressure relief component may be "thermally-activated", set to activate at a certain temperature. A pressure relief component may also be both "pressure-activated" and "thermally-activated".

Figure 3:
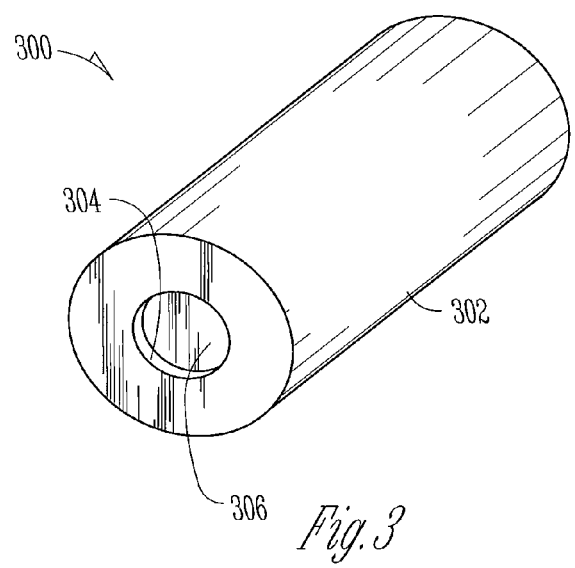
FIG. 3 illustrates a perspective view of a cylindrical fluid storage unit including an internal fluid distribution feature, according to some embodiments.

Referring to FIG. 3, a perspective view of a cylindrical fluid storage unit 300 including an internal fluid distribution feature is shown, according to some embodiments. A cylindrical fluid storage unit 300 may include composite fluid storage material 306 surrounded by an enclosure 302. An aperture 304 may allow for access to the fluid storage material 306. In the cylindrical design, the aperture 304 may be large to create an increased exposed surface area of the composite fluid storage material 306.

Figure 4:
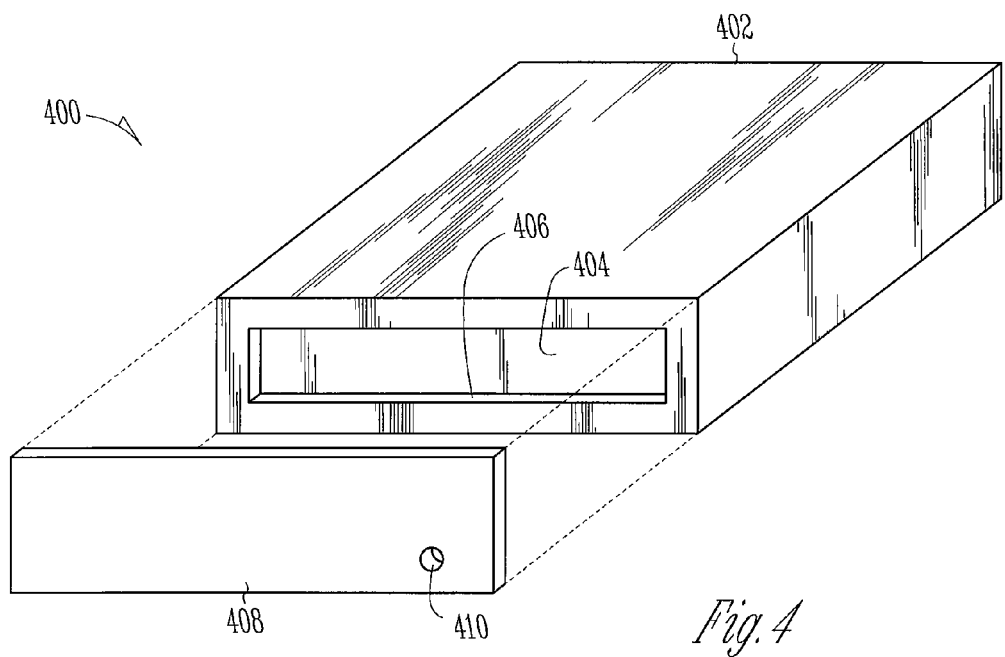
FIG. 4 illustrates a perspective view of a composite fluid storage unit utilizing a planar interface, according to some embodiments.

Referring to FIG. 4, a perspective view of a composite fluid storage unit 400 utilizing a planar interface is shown, according to some embodiments. The composite fluid storage unit 400 may include a composite fluid storage material 404 partially surrounded by enclosure 402. The composite fluid storage material 404 may be exposed by aperture 406.

The relatively large aperture 406 may allow for the composite fluid storage material 404 to be in contact with a planar interface 408. The shape and position of the aperture 406 may be of many types, such as serpentine or channeled, for example. The aperture 406 may include multiple apertures or sets of apertures, such as sets of serpentine, grooved or channeled apertures. Multiple, smaller apertures may better support the internal pressure of the unit. Multiple apertures, large apertures, serpentine openings, grooves, surface channels and other surface features may be considered internal fluid distribution features.

The planar interface 408 may include a port 410 for fluidic connectivity. The planar interface 408 may support, enclose, or connect to valves, pressure regulators or other planar interface devices, for example. Examples of such devices are discussed in Mclean et al., U.S. patent application Ser. No. 12/053,374, filed on Mar. 21, 2008, published as U.S. Patent App. Pub. 2008/0233446 on Sep. 25, 2008, and entitled "FLUIDIC CONTROL SYSTEM AND METHOD OF MANUFACTURE," and Zimmermann et al., U.S. patent application Ser. No. 60/919,470, filed on Mar. 21, 2007, and entitled "FLUIDIC PRESSURE REGULATOR ASSEMBLIES AND RELATED METHOD", the disclosures of which are incorporated herein by reference in their entirety. Further examples may be found in commonly owned U.S. patent application Ser. No. 11/621,542, which was filed Jan. 9, 2007, and published as U.S. Patent App. Pub. 2010/0258214 on Oct. 14, 2010, the disclosure of which is incorporated herein in its entirety.

Figure 5:
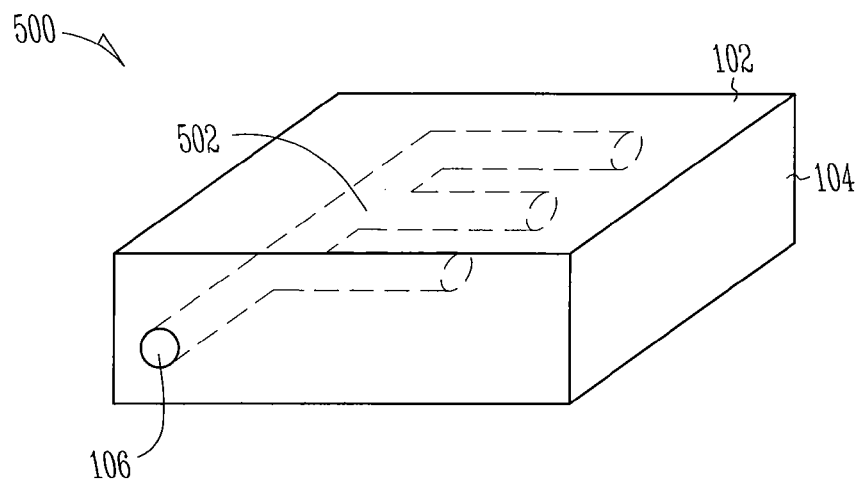
FIG. 5 illustrates a perspective view of a composite fluid storage unit including a preformed internal fluid distribution feature, according to some embodiments.

Referring to FIG. 5, a perspective view of a composite fluid storage unit 500 including a preformed internal fluid distribution feature is shown, according to some embodiments. The composite fluid storage unit 500 includes an enclosure 104 that surrounds composite fluid storage material 102. A channeled feature 502 with aperture 106 may be formed in the unit 500. The channeled feature 502 may allow for a deeper penetration of fluid into the composite material 102. The surface area exposed to the open space would be greatly increased and higher flow rates, heat transfer rates or other efficiencies may be achieved. The higher flow rates may be useful in applications involving large format enclosures or in supplying devices with high power demands. The unit may allow for a fluid delivery of a stoichiometric ratio of greater to or equal to one to an electrochemical cell layer. The electrochemical cell layer would not be "fuel-starved" as the unit may provide an increased flowrate and volume of fuel. This may be helpful, for instance, in which the electrochemical cell layer is a fuel cell layer and an increased flow rate and volume of fuel may be required to maintain high power demands from an external or portable device.

Figure 6:
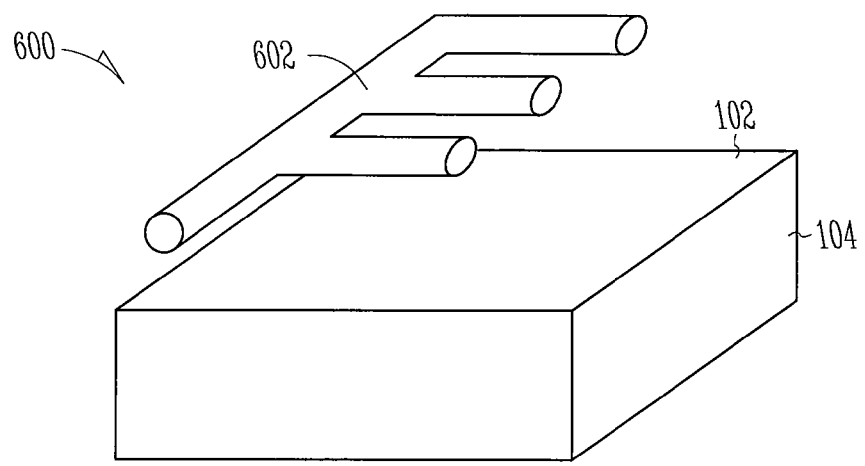
FIG. 6 illustrates a perspective view of a composite fluid storage unit and a sacrificial preform, according to some embodiments.

The channeled feature 502 may be formed by cross drilling boreholes into the unit 500. The channeled feature 502 may be formed in-situ as the composite fluid storage material 102 is being formed. The channeled feature 502 may be formed by utilizing a preform 602 (see FIG. 6), for example. The preform 602 may be porous and left in the unit 500 or may be sacrificial and eventually removed. The preform 602 may be manufactured of a porous polymer, porous carbon or porous metal. If sacrificial, the preform 602 may be manufactured of wax, low temperature polymer, a water soluble material or any material that can be removed once the unit 500 is formed. The removal of the sacrificial preform may be accomplished by heating, dissolving, irradiating, or other methods so as to remove the material and leave a channeled feature 502. The feature 502 may be formed by contacting two or more composite fluid storage material units with surface features to form an internal feature, for example.

Figure 7:
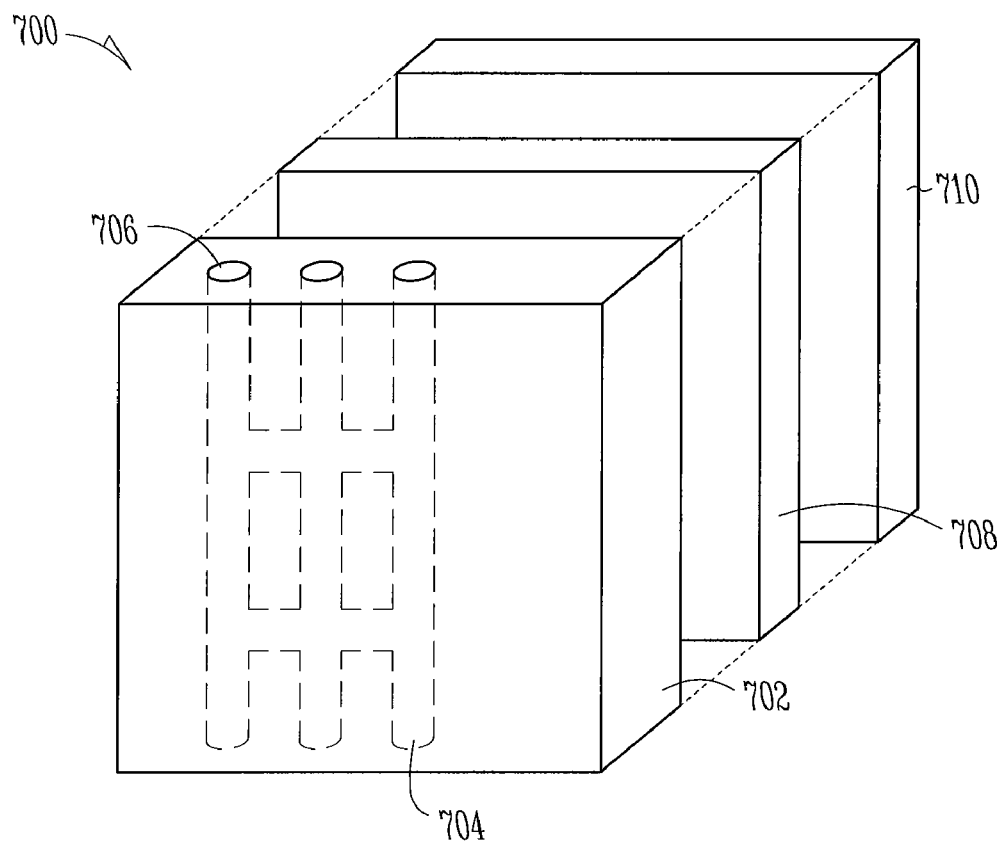
FIG. 7 illustrates a perspective view of a fuel cell system, according to some embodiments.

Referring to FIG. 7, a perspective view 700 of a fuel cell system is shown, according to some embodiments. A flexible enclosure 702 may include one or more internal fluid distribution features 704. One or more optional ports 706 may also be in contact with or integrated into the enclosure 702. One or more electrochemical cell layers 710 may be contact with the enclosure 702. An optional fluidic control layer 708 or system may be in fluidic contact with the one or more electrochemical cell layers 710 and the enclosure 702. The electrochemical cell layers 710 may be fuel cell layers, for example.

The one or more internal fluid distribution features 704 allow for an increased rate of fluid transfer between the fluid enclosure 702 and the one or more fuel cell layers 710. The features 704 may enhance heat transfer, uniformity of distribution of a fluid within the storage material, uniformity in reaction sites, reaction rate or number of reactions, for example. The system may also include a removable planar interface, such as in contact with the enclosure 702, for example. The optional fluidic control layer 708 may include one or features, devices or components configured to affect the flow of fluid into or out of the enclosure 702. Such devices or components may be arrays of fluidic controllers, regulators, valves, etc.

The one or more electrochemical cell layers 710 may include an electrochemical cell layer including a plurality of unit cells constructed by providing a substrate including a plurality of ion conducting regions. Such a substrate could be provided, for example by selectively treating a sheet of non- or partially-conducting material to form the ion conducting regions, or by selectively treating a sheet of ion conducting material to form non-conducting regions, as described, for example in the commonly-assigned application Ser. No. 11/047,558, which was filed 4 Feb. 2005, published as U.S. Patent App. Pub. 2005/0249994 on 10 Nov. 2005, and entitled "MEMBRANES AND ELECTROCHEMICAL CELLS INCORPORATING SUCH MEMBRANES", the disclosure of which is herein incorporated by reference. Unit cells according to the invention may be used in a planar electrochemical cell layer that is conformable to other geometries, as described in application Ser. No. 11/185,755, which was filed on 21 Jul. 2005, published as U.S. Patent App. Pub. 2007/0090786, and entitled "DEVICES POWERED BY CONFORMABLE FUEL CELLS" and application Ser. No. 60/975,132, filed 25 Sep. 2007, and entitled "FLEXIBLE FUEL CELL," which are hereby incorporated by reference.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized.

Array may refer to a plurality of individual unit cells. The plurality of cells may be formed on a sheet of ion exchange membrane material, a substrate, or may be formed by assembling a number of components in a particular manner. Arrays can be formed to any suitable geometry. Examples of planar arrays of fuel cells are described in co-owned U.S. application Ser. No. 11/047,560, which was filed on 2 Feb. 2005, published on 10 Nov. 2005 as U.S. Patent App. Pub. 2005/0250004, and entitled "ELECTROCHEMICAL CELLS HAVING CURRENT CARRYING STRUCTURES UNDERLYING ELECTROCHEMICAL REACTION LAYERS", the disclosure of which is herein incorporated by reference in its entirety. Fuel cells in an array can also follow other planar surfaces, such as tubes as found in cylindrical fuel cells. Alternately or in addition, the array can include flexible materials that can be conformed to other geometries.

Fuel cell layers may also include thin frame fuel cell structures and compact fuel cell layers. Examples of such embodiments may be found in commonly owned U.S. patents "FUEL CELL WITH REACTOR FRAME" and "COMPACT FUEL CELL LAYER", U.S. Pat. Nos. 7,241,525 and 7,067,217 respectively, the disclosures of which are herein incorporated by reference in their entirety.

Figure 8:
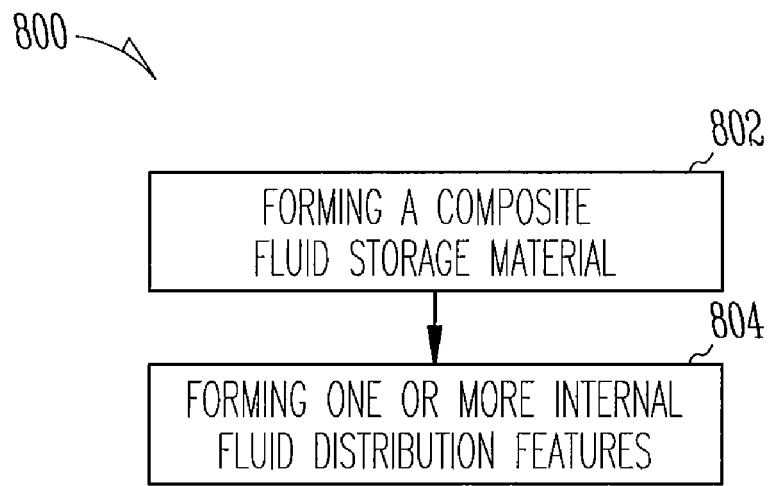
FIG. 8 illustrates a block flow diagram of a method of making a composite fluid storage unit utilizing an internal fluid distribution feature, according to some embodiments.

Referring to FIG. 8, a block flow diagram of a method of making a composite fluid storage unit utilizing an internal fluid distribution feature is shown, according to some embodiments. A composite fluid storage material may be formed 802. Forming 802 may include pressing and heating, for example. One or more internal fluid distribution features may be formed 804 in the composite fluid storage material. Forming 804 may include drilling, embossing, compression molding, placing a porous preform or removing a sacrificial preform, for example. An enclosure may be formed to partially or fully enclose the composite fluid storage material. The one or more internal fluid distribution features may be formed before or after the enclosure being formed, for example. Internal features may be formed 804 by contacting two or more composite fluid storage material units with surface features, thereby forming internal features when contacted, for example.

Figure 9:
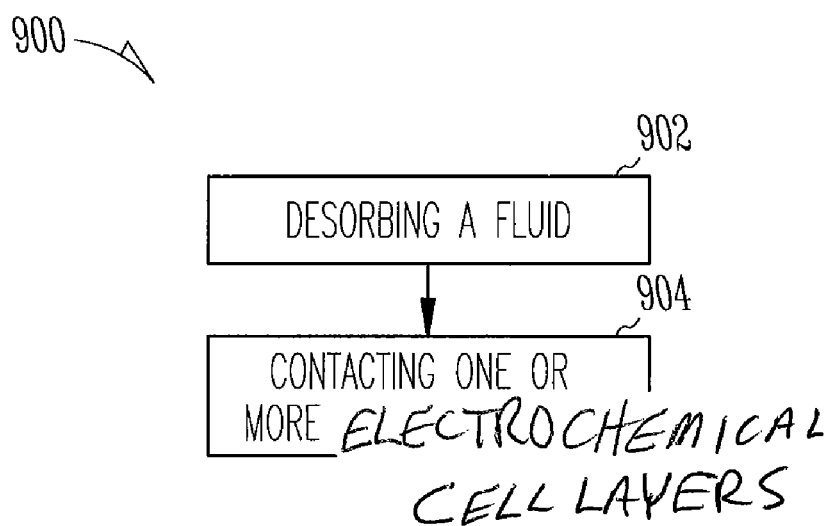
FIG. 9 illustrates a block flow diagram of a method of operating a fluid storage unit, according to some embodiments.

Referring to FIG. 9, a block flow diagram 900 of a method of operating a fluid storage unit is shown, according to some embodiments. A fluid may be desorbed 902 from a composite fluid storage material. The fluid may then contact 904 one or more electrochemical cell layers of an electronic device. The composite fluid storage material includes one or more internal fluid distribution features. The internal fluid distribution features may increase a flow rate, heat transfer rate, uniformity of fluid distribution, reaction rate or other properties to enhance the transfer of fluid from the composite fluid storage material to the one or more electrochemical cell layers. The flow rate, volume of fluid or both may greater than or equal to a rate of fluid consumption by the one or more fuel cell layers. If an external device requires a high power demand, the flow-rate may be greater than or equal to the consumption rate such that the electrochemical cell layers or external device are not starved for fuel.

Before or after desorbing 902, a composite fluid storage material within the unit or enclosure may be contacted with a fluid. The one or more internal fluid distribution features may increase a rate of contacting with a fluid, a uniformity of contacting with a fluid, or a combination thereof. Contacting with a fluid may include substantially uniform contacting of a composite fluid storage material with a fluid, throughout the fluid storage unit. Contacting may also include occluding or desorbing. In addition, contacting a composite fluid storage material with fluid may describe transferring fluid from the fluid storage material to one or more external devices, transferring fluid from one or more external devices to the fluid storage material, or both. The external device may be a fuel cell or a fuel cartridge. The rate of contacting may be increased about 10%, about 50% or about 100% or more as compared to a composite fluid storage material without internal fluid distribution features.

What is claimed is:

1. A fluid storage unit, comprising:
   at least one piece of a composite fluid storage material,
      wherein the composite fluid storage material comprises active material particles and a thermoplastic binder and
      wherein the active material particles are capable of occluding and desorbing a fluid and
      wherein the composite fluid storage material defines a plurality of pores; and,
   one or more internal fluid distribution features defined by the component storage material and wherein a first internal fluid distribution feature extends as a straight channel into the piece of composite fluid storage material, and further including an enclosure comprising an outer wall conformably coupled to the composite fluid storage material, wherein the composite fluid storage material supports stress applied on the outer wall by an internal fluid pressure.

2. The fluid storage unit of claim 1, wherein the active material particles include a hydrogen storage material.

3. The fluid storage unit of claim 1, further comprising a fluid and wherein the fluid is occluded by the composite fluid storage material.

4. The fluid storage unit of claim 3, wherein the active material particles are capable of occluding hydrogen.

5. The fluid storage unit of claim 3, wherein the fluid comprises one or more of alcohols, ammonia, ammonia derivatives, silanes, complex metal hydride compounds, boranes, hydrocarbons, carbazoles, saturated cyclic and polycyclic hydrocarbons and saturated amino boranes, formic acid, chemical hydrides and borohydride compounds.

6. The fluid storage unit of claim 1, wherein the one or more internal fluid distribution features are arranged so as to maintain structural integrity of the composite fluid storage material.

7. The fluid storage unit of claim 1, wherein the one or more internal fluid distribution features increase the transfer of heat into or out of the fluid storage unit, within the composite fluid storage material or both.

8. The fluid storage unit of claim 1, wherein the one or more internal fluid distribution features increase a uniformity in occluding a fluid, uniformity in desorbing a fluid or both substantially throughout the fluid storage unit.

9. The fluid storage unit of claim 1, further comprising one or more ports.

10. The fluid storage unit of claim 9, wherein the one or more ports are configured to transfer fluid to the unit, transfer fluid from the unit or both.

11. The fluid storage unit of claim 1, wherein the active material particles include a metal, a metal alloy, a metal compound capable of forming a metal hydride when in contact with hydrogen, or combinations thereof.

12. The fluid storage unit of claim 1, wherein the active material particles comprise magnesium, lithium, aluminum, calcium, boron, carbon, silicon, transition metals, lanthanides, intermetallic compounds, solid solutions thereof, or combinations thereof.

13. The fluid storage unit of claim 1, wherein the active material particles comprise silicas, aluminas, zeolites, graphite, carbon fibers, carbon aerogels, activated carbons, nano-structured carbons, micro-ceramics, nano-ceramics, boron nitride nanotubes, metal organic frameworks, palladium-containing materials or combinations thereof.

14. The fluid storage unit of claim 1, wherein the one or more internal fluid distribution features comprise boreholes, grooves, surface features, one or more apertures or a combination thereof.

15. The fluid storage unit of claim 14, wherein the one or more internal fluid distribution features comprise at least one borehole.

16. The fluid storage unit of claim 1, wherein the one or more internal fluid distribution features comprise a porous preform.

17. The fluid storage unit of claim 16, wherein the porous preform comprises a porous polymer, porous metal, a porous carbon, or a combination thereof.

18. The fluid storage unit of claim 1, wherein the one or more internal fluid distribution features comprise two or more independent features, positioned in the same plane relative to at least one dimension of the composite fluid storage material.

19. The fluid storage unit of claim 1, wherein the one or more internal fluid distribution features comprise two or more independent features, positioned in two or more planes relative to at least one dimension of the composite fluid storage material.

20. The fluid storage unit of claim 1, wherein the one or more internal fluid distribution features comprise one or more interconnected features.

21. The fluid storage unit of claim 20, wherein the one or more interconnected features comprise channels positioned in two or more planes relative to at least one dimension of the composite fluid storage material.

22. The fluid storage unit of claim 1, wherein the binder elastically immobilizes the active material particles sufficient to maintain relative spatial relationships between the active material particles before, during, and after any occluding and desorbing of the fluid and wherein the composite fluid storage material is capable of withstanding a force produced by a particle strain during occlusion and desorption of the fluid by the active material particles sufficient to provide a load-bearing member independently or within a fluid enclosure.

23. The fluid storage unit of claim 1, further including a second internal fluid distribution feature that intersects with the first internal fluid distribution feature.

24. The fluid storage unit of claim 1, wherein the first internal fluid distribution feature extends as a straight channel entirely through the piece of composite fluid storage material.

25. A fuel cell system, comprising:
  a fluid enclosure, comprising:
    at least one piece of a composite fluid storage material;
    one or more internal fluid distribution features defined by the piece of composite fluid storage material, wherein a first internal fluid distribution feature extends as a straight channel into the piece of composite fluid storage material; and
  one or more fuel cell layers, in fluidic communication with the fluid enclosure;
  wherein the composite fluid storage material comprises an active material and a thermoplastic binder, and wherein the active material is capable of occluding and desorbing a fluid and wherein the composite fluid storage material defines a plurality of pores, and wherein the enclosure comprises an outer wall conformably coupled to the composite fluid storage material, wherein the composite fluid storage material supports stress applied on the outer wall by an internal fluid pressure.

26. The fuel cell system of claim 25, further comprising a fluidic control system in fluidic contact with the one or more fuel cell layers and the enclosure.

27. The fuel cell system of claim of claim 25, further comprising a removable planar interface.

28. The fuel cell system of claim 25, wherein the enclosure further comprises one or more ports.

29. The fluid storage unit of claim 25, wherein the one or more internal fluid distribution features comprise at least one borehole.

30. The fuel cell system of claim 25, wherein the binder elastically immobilizes the active material particles sufficient to maintain relative spatial relationships between the active material particles before, during, and after any occluding and desorbing of the fluid and wherein the composite fluid storage material is capable of withstanding a force produced by a particle strain during occlusion and desorption of the fluid by the active material particles sufficient to provide a load-bearing member within the fluid enclosure.

31. The fuel cell system of claim 25, further including a second internal fluid distribution feature that intersects with the first internal fluid distribution feature.

32. The fuel cell system of claim 25, wherein the first internal fluid distribution feature extends as a straight channel entirely through the piece of composite fluid storage material.

* * * * *

UNITED STATES PATENT AND TRADEMARK OFFICE
CERTIFICATE OF CORRECTION

PATENT NO. : 8,372,561 B2  
APPLICATION NO. : 12/052848  
DATED : February 12, 2013  
INVENTOR(S) : Zimmermann et al.

Page 1 of 1

It is certified that error appears in the above-identified patent and that said Letters Patent is hereby corrected as shown below:

In the Specifications

In column 3, line 24, after "limitation", insert --,--, therefor

In column 3, line 26, delete "cell" and insert --cells--, therefor

In column 4, line 1, before "Apr.", delete "¶", therefor

In column 4, line 25, delete "ldehydriding" and insert --dehydriding--, therefor In column 5, line 4, delete "of" and insert --off--, therefor In column 5, line 8, before "the", insert --of--, therefor In column 6, line 9, before "of", insert --features--, therefor In column 6, line 32, before "in", insert --may be--, therefor In column 6, line 35, after "example", insert --.--, therefor In the Claims In column 10, line 41, in Claim 1, before "and", insert --;--, therefor In column 10, line 43, in Claim 1, before "and", insert --;--, therefor In column 10, line 45, in Claim 1, delete "and," and insert --and--, therefor Signed and Sealed this  
Seventh Day of May, 2013

Teresa Stanek Rea  
*Acting Director of the United States Patent and Trademark Office*